(No Model.)
J. W. GIBBONEY.
ELECTRIC METERING SYSTEM.
No. 558,585. Patented Apr. 21, 1896.
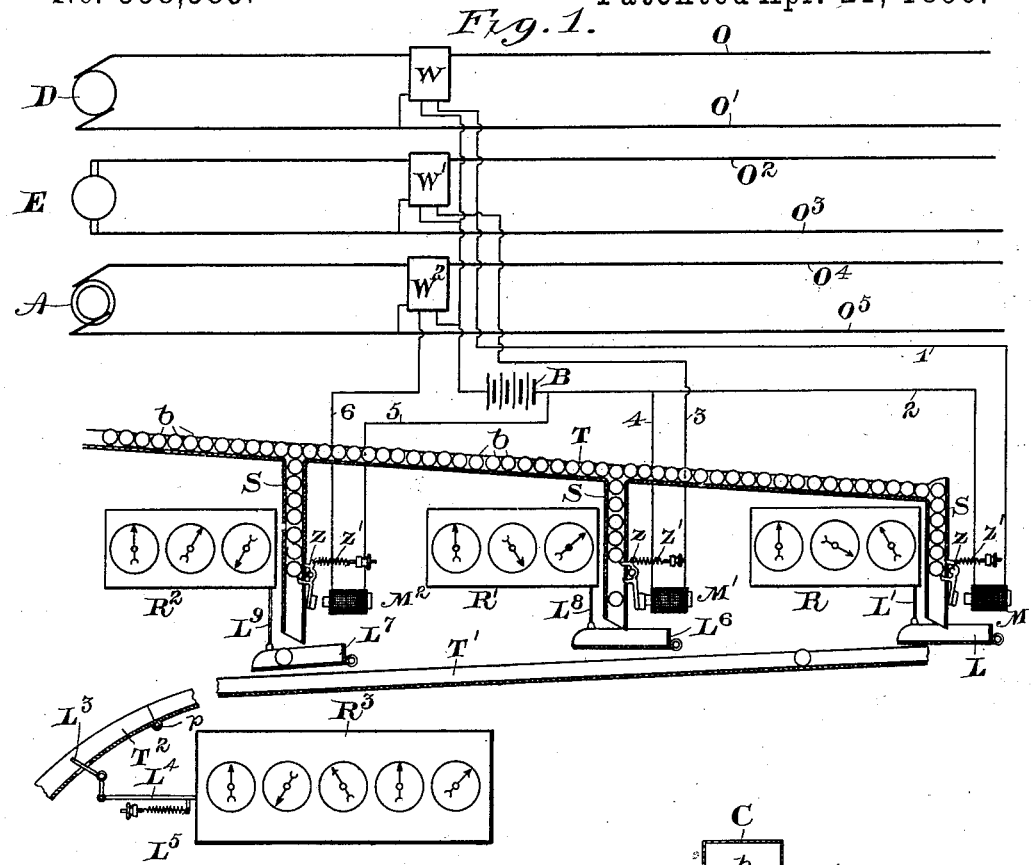
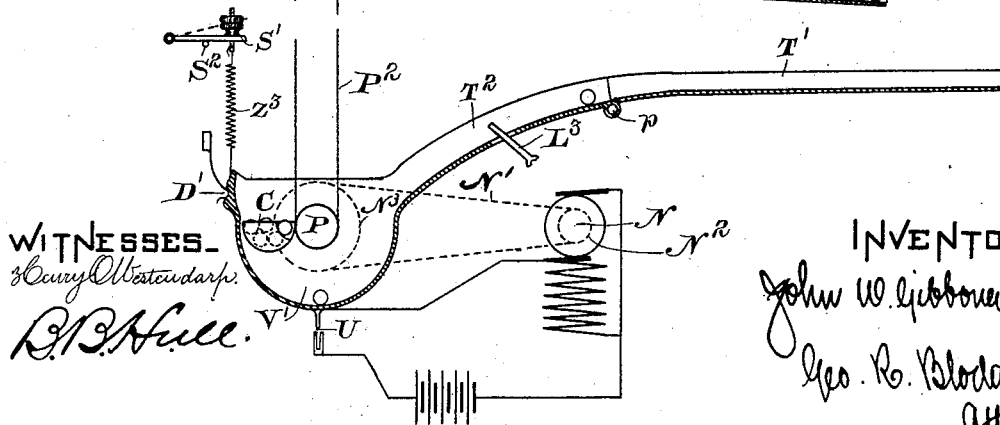
WITNESSES
Henry Westendarp
R. B. Hill.
INVENTOR
John W. Gibboney by
Geo. R. Blodgett,
Atty.

UNITED STATES PATENT OFFICE.

JOHN W. GIBBONEY, OF LYNN, MASSACHUSETTS, ASSIGNOR TO THE GENERAL ELECRTIC COMPANY, OF NEW YORK.

ELECTRIC METERING SYSTEM.

SPECIFICATION forming part of Letters Patent No. 558,585, dated April 21, 1896.

Application filed March 6, 1895. Serial No. 540,722. (No model.)

*To all whom it may concern:*

Be it known that I, JOHN W. GIBBONEY, a citizen of the United States, residing at Lynn, in the county of Essex, State of Massachusetts, have invented certain new and useful Improvements in Electric Metering Systems, of which the following is a specification.

The present invention relates to a system of metering the amount of energy delivered by an electrical supply station, and its purpose is to render it possible at any time to determine the amount of energy, watts, or current delivered from any machine or group of machines for one kind of work and from other machines for other kinds of work, and also to indicate the total supply of energy delivered by the station. To accomplish this result, meters which separately record the power delivered from each machine or group of machines of the plant are used, which actuate meters or recording-registers, and these in turn successively actuate, or cause to be actuated, another meter or register, which adds the registry of all the other meters and indicates the result. This latter meter may properly therefore be called a "summation" meter or register.

It is generally most convenient to have the readings for all the meters made at one place, as in the office of the electrical power station, and as it is not usually economical to bring the main conductors, omnibus-bars, &c., to the office or where the instruments are to be grouped it becomes necessary to provide in the office a secondary set of meters or registers controlled by the meters located conveniently near the supply-mains—as, for instance, upon the station-switchboard. These secondary meters are conveniently operated through means controlled by electromagnets, the current through the latter being controlled by contacts which are opened and closed by the action of the meters upon the switchboard. It is not so easy, however, to operate the summation-meter properly, because contact may be made by two or more meters at the switchboard simultaneously, or nearly so, and the summation-meter would therefore record but one additional unit when two or more should be added. Obviously, also, the more meters there are in use the more likely is it to happen that two or more contacts may be made near together, and consequently the greater is the liability to error in the summation-meter. This difficulty is overcome by the present invention and makes it possible to employ any number of meters for the respective work circuits, while the summation-meter will accurately add and indicate the total energy delivered, and this is accomplished by providing an arrangement which causes the summation-meter to be operated properly, no matter whether the impulses which operate the other meters take place one after the other or at the same instant.

In the accompanying drawings, Figure 1 is a diagrammatic view, partly in section and broken away, illustrating the manner of carrying out the invention. Figs. 2 and 3 are detail views in section showing an apparatus for returning the balls to their starting-point.

Referring to Fig. 1, O O' may represent the omnibus-bars for a direct-current dynamo or dynamos D, $O^2$ $O^3$ the omnibus-bars for a power circuit-generator E, such as a railway circuit-generator, and $O^4$ $O^5$ the omnibus-bars for an alternating-current system of generators A.

W W' $W^2$ represent wattmeters having series and shunt-coils and connected properly with the circuits above mentioned, respectively. The moving element of these wattmeters governs an electrical contact, one each in the circuits 1 2, 3 4, 5 6, and thereby the circuit, through the magnets M M' $M^2$, from a battery B or other current source. Contact may be made, for example, for every revolution of the armature of the wattmeter or for a definite number of revolutions by interposing suitable gearing. A wattmeter like the "Thomson wattmeter," now well known, is well adapted for such use. It has not been necessary to illustrate this contact-making mechanism, as it is now so well understood and can be carried out in a number of ways.

R R' $R^2$ represent the secondary meters located, for example, in the office and controlled, respectively, by the meters W W' $W^2$. The instruments R R' $R^2$ are in fact merely counters which register the number of times contact is closed by the true meters W W' W². The meter or counter R³ is the summation-meter, and to cause it to be properly operated in adding the readings of the other instruments, no matter whether the magnets M M' M² act one after the other or at nearly the same instant or simultaneously, it is not actuated directly by such magnets, but by intervening means controlled by such magnets and which cause the summation-meter to be operated, however the impulses from the meters W W' W² may have arrived in their order, and this is the main feature of the present invention. One way of doing this is to allow the magnets M M' M², as many as may be in use, to release balls of metal or other hard substance, which are allowed to fall upon inclined ways and which in their passage along the ways naturally arrange themselves in line. Each ball by its movement along such ways subsequently operates the summation meter or counter. Thus in Fig. 1, T is a trough or way having a number of balls $b$ $b$, which tend to roll toward the right, or in the direction of the inclination of the way. These balls drop into vertical chutes S and are held in place by detents Z, projecting into the vertical chutes and controlled by reacting springs Z', as shown, and are allowed to escape, one at a time, every time an impulse comes from the meters upon the switchboard to one or more of the electromagnets M M' M². Thus a momentary closure of the contact of the meter W energizes the magnet M, which, in attracting its armature, actuates its detent Z to allow one ball to drop into the way T', the detent returning to its original position by means of its spring Z'. The ball falls upon a hinged shelf L, pivoted at one end, as shown, and connected by a rod L' to the register R, and the weight of the ball depressing the shelf L actuates the register R to indicate one unit, and then falls upon the way T', suitably inclined, rolls to the part T², where it moves more rapidly, actuates the bell-crank lever L³, connected by a rod L⁴, controlled by a retracting-spring L⁵, to the summation meter or counter R³, and causes the latter to register one unit. Similarly, balls from all the other meters, M' M², &c., with hinged shelves L⁶ L⁷, connecting-rods L⁸ L⁹, actuate such meters, respectively, and afterward the summation-meter, and it matters not in what order the balls fall, as they will arrange themselves in line and operate the summation-meter properly. The way T², it will be noted, is given a gradually-increasing inclination. This is done in order that, if two or more balls should be very close together or touching, the foremost ball will attain an increased speed and leave the others, operate the lever L³, and give time for this lever to be returned by its spring ready for the next ball in the series.

After the balls have accomplished their work they may be returned automatically to their position upon the upper way T, and in Figs. 2 and 3 is shown one way of doing this. After passing the way T² the balls are gathered into a receptacle V', movable with the way T² around a pivot at $p$ and held in position by a spring Z³, connected to the lever S', resting on a pin S² and by a detent D'. Connected to or operated by the movement of the vessel V' is a switch U, which connects and disconnects a small motor N with a current source B'. The motor N runs, by means of a belt N' and a pulley N², a small elevator or belted carrier consisting of two pulleys P and P', around which passes a belt P², having attached to it a scoop C, the pulley N³ being mounted on the shaft of the pulley P. The scoop C is so constructed that it discharges the balls laterally into a trough T³, emptying into a vessel V, and from this vessel the balls pass to the way T, Fig. 1. The construction to discharge the balls is clearly understood from Figs. 2 and 3. When a given number of balls have fallen into the vessel V', their weight overcomes the spring Z³ and the detent D' and the vessel falls, closing the switch U. The motor N then starts into rotation, operating the bolt $p²$, and the scoop C picks up the balls and removes the weight from the vessel V'. The switch U remains closed, however, owing to the friction of its switch-plates. In its upward passage the edge of the scoop C engages with the end of the lever S' and so extends the spring Z³ as to snap the switch U open and cause the vessel V' to be again engaged by the detent D'. The motor then stops until another lot of balls have collected, when the action is repeated, the first lot of balls are discharged above, the scoop picks up the balls in the vessel V', operates the switch as before, and so on, so that the same balls are used over and over. Of course the balls may be returned by a carrier which is continually operated, or even by hand, if desired.

In Fig. 1 it will be seen that the chutes are so spaced that a ball always rests immediately over those below it, and the escapement is so spaced from the way T that the upper ball is slightly below its fellows, so that any pressure is exerted to one side of a diameter, and in this way each chute is sure to be kept supplied with balls. Of course the vessel V might be extended so as to supply all the chutes.

It is to be understood that the invention is not limited to the specific means described for operating the registers and escapements, as the invention broadly covers the system and combinations set forth in the claims.

What I claim as new, and desire to secure by Letters Patent of the United States, is—

1. The combination with a system of electric meters individually connected with their respective supply-mains and adapted to operate successively or simultaneously, of a summation-register adapted to separately add the units of such meters after each unit is recorded, and means intermediate of the meters and summation-register for actuating the latter consecutively after the operation of each of said meters.

2. The combination in an electric metering system, of a number of meters severally connected with supply-mains and adapted to operate successively or simultaneously, a number of registers each directly or indirectly actuated respectively by each of said meters, and a summation-register adapted to be operated each time an individual register operates, but subsequently thereto.

In witness whereof I have hereunto set my hand this 4th day of March, 1895.

JOHN W. GIBBONEY.

Witnesses:
HENRY O. WESTENDARP.
N. M. HAWKES.